United States Patent
Cazier

(10) Patent No.: US 12,353,647 B2
(45) Date of Patent: Jul. 8, 2025

(54) KEY SELECTION FOR AN EXTENDED REALITY KEYBOARD

(71) Applicant: Hewlett-Packard Development Company, L.P., Spring, TX (US)

(72) Inventor: Robert Paul Cazier, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/689,847

(22) PCT Filed: Sep. 28, 2021

(86) PCT No.: PCT/US2021/052466
§ 371 (c)(1),
(2) Date: Mar. 6, 2024

(87) PCT Pub. No.: WO2023/055346
PCT Pub. Date: Apr. 6, 2023

(65) Prior Publication Data
US 2024/0385699 A1   Nov. 21, 2024

(51) Int. Cl.
*G06F 3/0346* (2013.01)
*G06F 3/01* (2006.01)
(Continued)

(52) U.S. Cl.
CPC .......... *G06F 3/0346* (2013.01); *G06F 3/011* (2013.01); *G06F 3/017* (2013.01); *G06F 3/02* (2013.01);
(Continued)

(58) Field of Classification Search
CPC ........ G06F 3/0346; G06F 3/011; G06F 3/017; G06F 3/02; G06F 3/0482; G06F 3/04842;
(Continued)

(56) References Cited

U.S. PATENT DOCUMENTS

2018/0113599 A1* 4/2018 Yin .................. G06F 3/017
2018/0232136 A1* 8/2018 Sparandara ......... G06F 3/04886
(Continued)

FOREIGN PATENT DOCUMENTS

| | | |
|---|---|---|
| CN | 106896915 A | 6/2017 |
| EP | 3528094 A1 | 8/2019 |

*Primary Examiner* — Brent D Castiaux
(74) *Attorney, Agent, or Firm* — Quarles & Brady LLP

(57) ABSTRACT

In an example implementation according to aspects of the present disclosure, a XR system comprises an HMD which includes an HMD display, a user input device, and a processor operatively coupled with a computer readable storage medium and instructions stored on the computer readable storage medium that, when executed by the processor, direct the processor to display, by the HMD display, an XR keyboard to a user of the HMD, wherein the XR keyboard comprises keys lined along the perimeter of the XR keyboard; display, by the HMD display, at least one projection line indicating a selection direction by the user; capture, by the user input device, a movement of the at least one projection line across a key on the perimeter of the XR keyboard displayed on the HMD display; and identify a key selected based on the captured movement across the key.

12 Claims, 6 Drawing Sheets

(51) Int. Cl.
    *G06F 3/02*      (2006.01)
    *G06F 21/36*     (2013.01)
    *G06T 11/60*     (2006.01)

(52) U.S. Cl.
    CPC .............. *G06F 21/36* (2013.01); *G06T 11/60* (2013.01); *G06T 2200/24* (2013.01)

(58) Field of Classification Search
    CPC ..... G06F 21/36; G06T 11/60; G06T 2200/24; G02B 27/017; G02B 2027/0138
    See application file for complete search history.

(56) References Cited

U.S. PATENT DOCUMENTS

| 2020/0033939 A1* | 1/2020 | Liu ........................ G06F 3/011 |
| 2020/0250284 A1 | 8/2020 | Diehl et al. |

\* cited by examiner

STORAGE MEDIUM 500

INSTRUCTIONS TO DISPLAY XR KEYBOARD AND PROJECTION LINE
502

INSTRUCTIONS TO DETECT SLICING MOVEMENT OF PROJECTION LINE
504

INSTRUCTIONS TO IDENTIFY SYMBOL SELECTED BASED ON DETECTED SLICING MOVEMENT
506

FIG. 5

KEY SELECTION FOR AN EXTENDED REALITY KEYBOARD

BACKGROUND

Head mounted devices may be used to provide an altered reality to a user. An extended reality (XR) device may include a virtual reality (VR) device, an augmented reality (AR) device, and/or a mixed reality (MR) device. XR devices may include displays to provide a VR, AR, or MR experience to the user by providing video, images, and/or other visual stimuli to the user via the displays. XR devices may be worn by a user.

BRIEF DESCRIPTION OF THE DRAWINGS

Many aspects of the disclosure can be better understood with reference to the following drawings. While several examples are described in connection with these drawings, the disclosure is not limited to the examples disclosed herein.

FIG. 5 illustrates a block diagram of a non-transitory storage medium storing machine-readable instructions to enable a user to select a symbol using an XR keyboard, according to an example.

DETAILED DESCRIPTION

Figure 1:
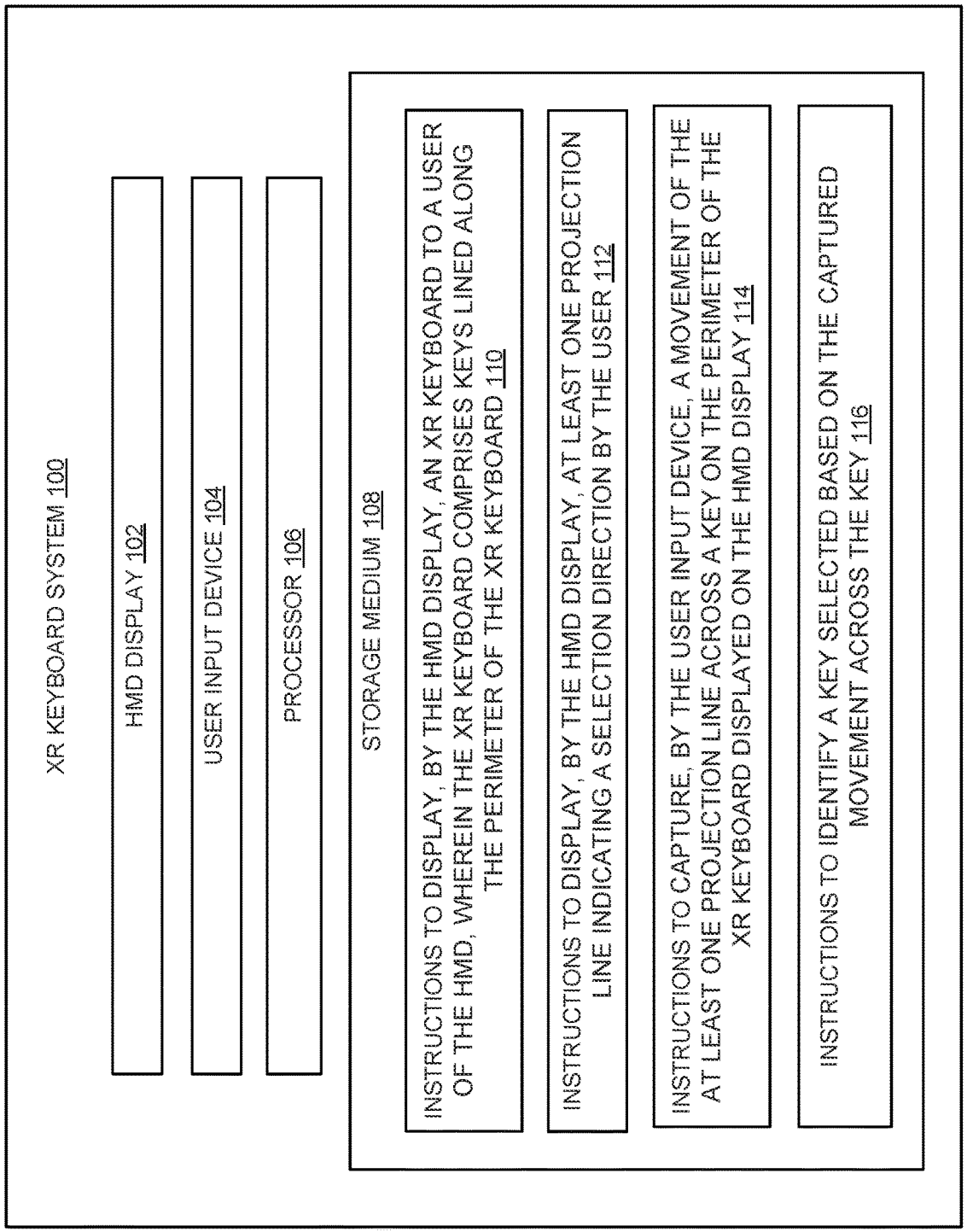
FIG. 1 illustrates a block diagram of an extended reality (XR) system for key selection on an XR keyboard, according to an example.

Extended reality (XR) devices may provide an altered reality to a user by providing video, audio, images, and/or other stimuli to a user via a display. As used herein, the term "XR device" refers to a device that provides a virtual reality (VR), augmented reality (AR), and/or mixed reality (MR) experience for a user.

The XR device may be experienced by a user through the use of a head mount device (e.g., a headset). For example, a user may wear the headset in order to view the display of the XR device and/or experience audio stimuli of the XR device. As used herein, the term "extended reality" refers to a computing device generated scenario that simulates experience through senses and perception. In some examples, an XR device may cover a user's eyes and provide visual stimuli to the user via a display, thereby substituting an "extended" reality (e.g., a "virtual reality", "augmented reality" and/or "mixed reality") for actual reality.

Computing devices provide access to data and applications to users. Such informational exchange is independent of geographic boundaries and may be portable. For example, a user may access certain information stored on their home computing device even when they are not at home, for example through an XR device. The global nature of information exchange provides countless benefits to users of those computing devices as information has become more widespread and portable. However, the user must be authenticated prior to accessing the private information or personal applications.

Data entry may be difficult for XR experiences. Many of these experiences require sign in of some type or data entry much like a "regular" personal computer (PC) experience. For example, signing into a gaming account currently requires "touch typing" on a keyboard while wearing a headset or a virtual "hunt and peck" keyboard within the experience. These methods are clunky and cumbersome. In some cases, a user needs to partially remove the headset to see the keyboard, or it takes a long time and lots of errors to hunt and peck through a keyboard. While projection keyboards in the XR experience may be utilized, these are also error prone and problematic to calibrate finger position and finger action for keyboard virtual typing.

The present disclosure provides an HMD system which may detect slicing movements of a user to select a key in an XR environment. In particular, what is described is a slice keyboard, which lends itself to the actions inherently easy for either controller or hand-based experiences. Conceptually, this idea works far better than the traditional hunt and peck keyboard entry methods or methods requiring a user to remove the HMD. Furthermore, this method is discreet as there is no requirement to vocalize letters for passwords or create unnecessary noise.

In an example implementation according to aspects of the present disclosure, a XR system comprises an HMD which includes an HMD display, a user input device, and a processor operatively coupled with a computer readable storage medium and instructions stored on the computer readable storage medium that, when executed by the processor, direct the processor to display, by the HMD display, an XR keyboard to a user of the HMD, wherein the XR keyboard comprises keys lined along the perimeter of the XR keyboard; display, by the HMD display, at least one projection line indicating a selection direction by the user; capture, by the user input device, a movement of the at least one projection line across a key on the perimeter of the XR keyboard displayed on the HMD display; and identify a key selected based on the captured movement across the key.

In another example implementation, a method of authorizing a user of an HMD comprises displaying, by an HMD display, a virtual keyboard to a user, wherein the virtual keyboard comprises symbols lined along the perimeter of the virtual keyboard; displaying, by the HMD display, at least one projection line indicating a selection direction by the user; detecting, by a user input device, a movement of the at least one projection line across a symbol on the perimeter of the virtual keyboard displayed on the HMD display; identifying a symbol selected based on the detected movement across the symbol; and authenticating the user based on the identified symbol In yet another example, a non-transitory computer readable medium comprises instructions executable by a processor to display, by an XR display, an XR keyboard to a user and at least one projection line indicating a selection direction by the user, wherein the XR keyboard comprises symbols lined along the perimeter of the XR keyboard. The instructions executable by the processor further detect, by a user input device, a slicing movement of the at least one projection line across a symbol on the perimeter of the XR keyboard displayed on the XR display. The instructions executable by the processor further identify a symbol selected based on the detected slicing movement across the symbol.

FIG. 1 illustrates a block diagram of an XR system for key selection on an XR keyboard, according to an example. XR keyboard system 100 depicts HMD display 102, computing device 104, processor 106, and storage medium 108. As an example of XR keyboard system 100 performing its operations, storage medium 108 may include instructions 110-116 that are executable by processor 106. Thus, storage medium 108 can be said to store program instructions that, when executed by processor 106, implement the components of XR keyboard system 100.

Figure 2:
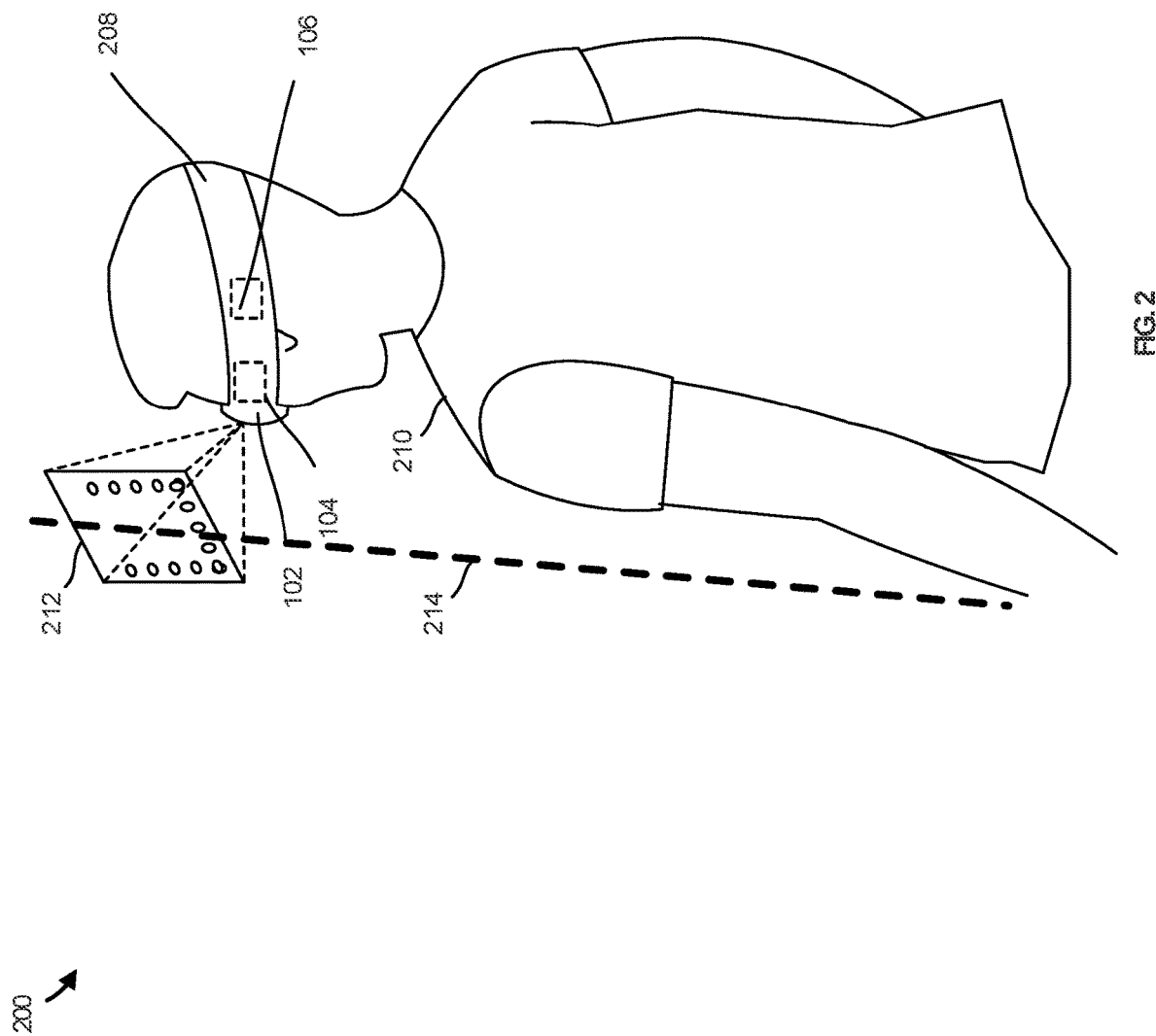
FIG. 2 illustrates a diagram of a user wearing an HMD which enables a user to select a key on an XR keyboard, according to an example.

HMD display 102 refers to any device that presents visual information to viewers. Examples of HMD display 102 include computer screens, smart device screens, tablet screens, and mobile device screens. In one particular example, HMD display 102 is formed in a headset that is worn by a user when using an enhanced reality system. An example of such a headset is depicted in FIG. 2 below.

XR keyboard system 100 also includes user input device 104 to capture body movements of a user looking at HMD display 102. In general, user input device 104 is an electronic system that detects and reports at least a user's hand movements or body movements. For example, user input device 104 may include at least one hand controller. The hand controller may include an inertial measurement unit (IMU), a camera, a gyroscope, an accelerometer, or some other device capable to detecting a user gesture or movement.

In some examples, user input device 104 may include an infrared or visible light camera. In some examples, user input device 104 is integrated onto HMD 102. For example, user input device 104 may be formed on a same surface of an internal part of the housing that HMD 102 is formed and may point towards the user's body or head. In another example, user input device 104 may be located on computing device 104 where a camera is directed towards the user to track their hand and body movements and positions.

Processor 106 includes the hardware architecture to retrieve executable code from the memory and execute the executable code. As specific examples, Processor 106 as described herein may include a controller, an application-specific integrated circuit (ASIC), a semiconductor-based microprocessor, a central processing unit (CPU), and a field-programmable gate array (FPGA), and/or other hardware device.

Storage medium 108 represents any number of memory components capable of storing instructions that can be executed by processor 106. As a result, storage medium 108 may be implemented in a single device or distributed across devices. Likewise, processor 106 represents any number of processors capable of executing instructions stored by storage medium 108.

In some examples, HMD 102 may comprise an All-In-One (AIO) device HMD 102 includes a processor (e.g., processor 106) and a storage system (e.g., storage medium 108) and wherein at least a portion of instructions 110-118 are included on HMD 102. In other examples, HMD 102 may be tethered (either wirelessly or wired) to a host computing device to receive instructions from processor 106 and storage system 108 residing on the host computing device.

In particular, the executable instructions stored in storage medium 108 include, as an example, instructions 110 represent program instructions that when executed by processor 106 cause XR keyboard system 100 to display, by HMD display 102, an XR keyboard to a user of the HMD, wherein the XR keyboard comprises keys lined along the perimeter of the XR keyboard. The XR keyboard display may be triggered to be displayed based on an input by the user or by an application running on XR keyboard system 100 (e.g., display of an authentication screen, a prompt for a user to enter credentials, etc.).

Instructions 112 represent program instructions that when executed by processor 106 cause XR keyboard system 100 to display, by HMD display 102, at least one projection line indicating a selection direction by the user. In some examples, XR keyboard system 100 further comprises hand controllers (e.g., including a gyroscope and/or an accelerometer) to detect user hand gestures indicating the selected key or sequence of keys displayed on the HMD display 102. In this example, the direction of the hand controllers may be extended in the XR environment to comprise the projection line. In other examples, XR keyboard system 100 further comprises a camera to detect user hand gestures indicating the selected key or sequence of keys displayed on the HMD display 102. In this example, the direction of the user's hand may be extended in the XR environment to comprise the projection line.

Instructions 114 represent program instructions that when executed by processor 106 cause XR keyboard system 100 to capture, by user input device 104, a movement of the at least one projection line across a key on the perimeter of the XR keyboard displayed on the HMD display. In some examples, instructions 114 further instruct processor 106 to detect a user push of a button on the at least hand controller which indicates a modality change from a first set of keys to a second set of keys lined along the perimeter of the XR keyboard (e.g., capital letters to lower case letters).

In other examples, instructions 114 further instruct processor 106 to detect a user hand gesture using a camera directed at the user which indicates a modality change from a first set of keys to a second set of keys lined along the perimeter of the XR keyboard. In yet another example, instructions 114 further instruct processor 106 to detect, by the at least one projection line across a virtual key selection, an indication to select a different modality from a first set of keys to a second set keys lined along the perimeter of the XR keyboard.

Instructions 116 represent program instructions that when executed by processor 106 cause XR keyboard system 100 to identify a key selected based on the captured movement across the key. For example, the user's selection of keys of may indicate user credentials and/or a passcode which may be used to authenticate the user. The user may be authenticated by an application running on HMD 102, a host computing device, or some other computing device communicately coupled to XR keyboard system 100 (e.g., application operating in a cloud-based environment).

In some examples, the selected key is identified based on the captured slicing movement from inside the perimeter to outside the perimeter across the key. In this example, instructions 116 may further direct processor 106 to identify another slicing movement from the outside of the perimeter to the inside of the perimeter of the XR keyboard before another key is selected. In other examples, instructions 116 may further direct processor 106 to identify a circular movement into the perimeter of the XR keyboard before another key is selected. An operation of this is further described in FIG. 3.

For example, the controller projection lines may be used in an in-to-out pattern that triggers the typing of a letter. The non-action to reset and type another letter is either ignoring an out-to-in action or creating a reentry area that allows the projections to do nothing as they move back to the center (i.e., the circular motion). In another example, "in to out" cameras may be mounted on the HMD. These cameras can be used to create virtual hands within the experience. The hands are then projected into the experience.

While the controller version is shown based on the slicing action of a sword, a deviation for a user's hands may be created. These deviations may include moving the selection options closer virtually to the user to enable fewer sweeping motions that may be easier when using the hand controller design. In either scenario (controller and hand based), the experience can be further modified to include a trigger/gesture by the user's hand (e.g., fist to open hand) or a button on the controller to switch modality. One example modality may be when the user desires to switch between capital letters and lower case. In this example, a fist or hand gesture can be used in the hand driven case, such as a fist is used to go to capital letters.

FIG. 2 illustrates a diagram of a user wearing an HMD which enables a user to select a key on an XR keyboard, according to an example. As described above, XR keyboard system 100 may be formed in an enhanced reality system. Accordingly, HMD 102 may be an HMD that is worn by user 210 to generate visual, auditory, and other sensory environments, to detect user input, and to manipulate the environments based on the user input. While FIG. 2 depicts a particular configuration of XR HMD 208, any type of enhanced reality headset may be used in accordance with the principles described herein.

FIG. 2 also depicts dashed boxes representing processor 106 and user input device 104 (e.g., camera or hand controller input) to detect the projection line 214. While FIG. 2 depicts these components disposed on XR HMD 208, either of these components may be placed on another device. For example, processor 106 may be found on a host computing device. In some examples, processor 106 of XR keyboard system 100 may be disposed on a host computing device.

As described above, HMD 102 displays a visual perimeter of keys 212. In some examples, user 210 may be authenticated via movements of the user's hands or body corresponding to projection line 214 during login/authentication and comparing those movements of projection line 214 to correlating visual keys of visual perimeter of keys 212. In the example depicted in FIG. 2, visual perimeter of keys 212 is a square, however visual perimeter of keys 212 may take other forms as long as they are not the same.

In some examples, XR HMD 208 may detect when a user takes on/off XR HMD 208 and XR keyboard system 100 may take appropriate action. For example, when taken off, XR keyboard system 100 may re-trigger the authentication process and end a current session. In this example, XR keyboard system 100 may include an IMU or other motion sensing unit to detect when XR HMD 208 is taken off completely (not just resting on the head). The same sensing unit may be used to determine when XR HMD 208 is put back on a user head. XR keyboard system 100 may first identify the user of XR HMD 208 before authenticating the user using the private display on HMD display 102.

As described above, the authentication movements to authenticate the user is user-specific and so may be transferable to other devices. In this example, the authentication movements are associated with supporting authentication credentials (such as voice ID, touch ID, or password) such that the authentication movements is retrieved on any device where supporting authentication credentials are input. For example, if user 210 switches to a different enhanced reality headset, user 210 may input their voice ID or touch ID.

XR keyboard system 100 may uniquely identify user 210 from a database of users. After this, XR keyboard system 100 logs the device name in the user's account and creates encrypted information that includes their unique authentication movements which allows them to login.

Figure 3:
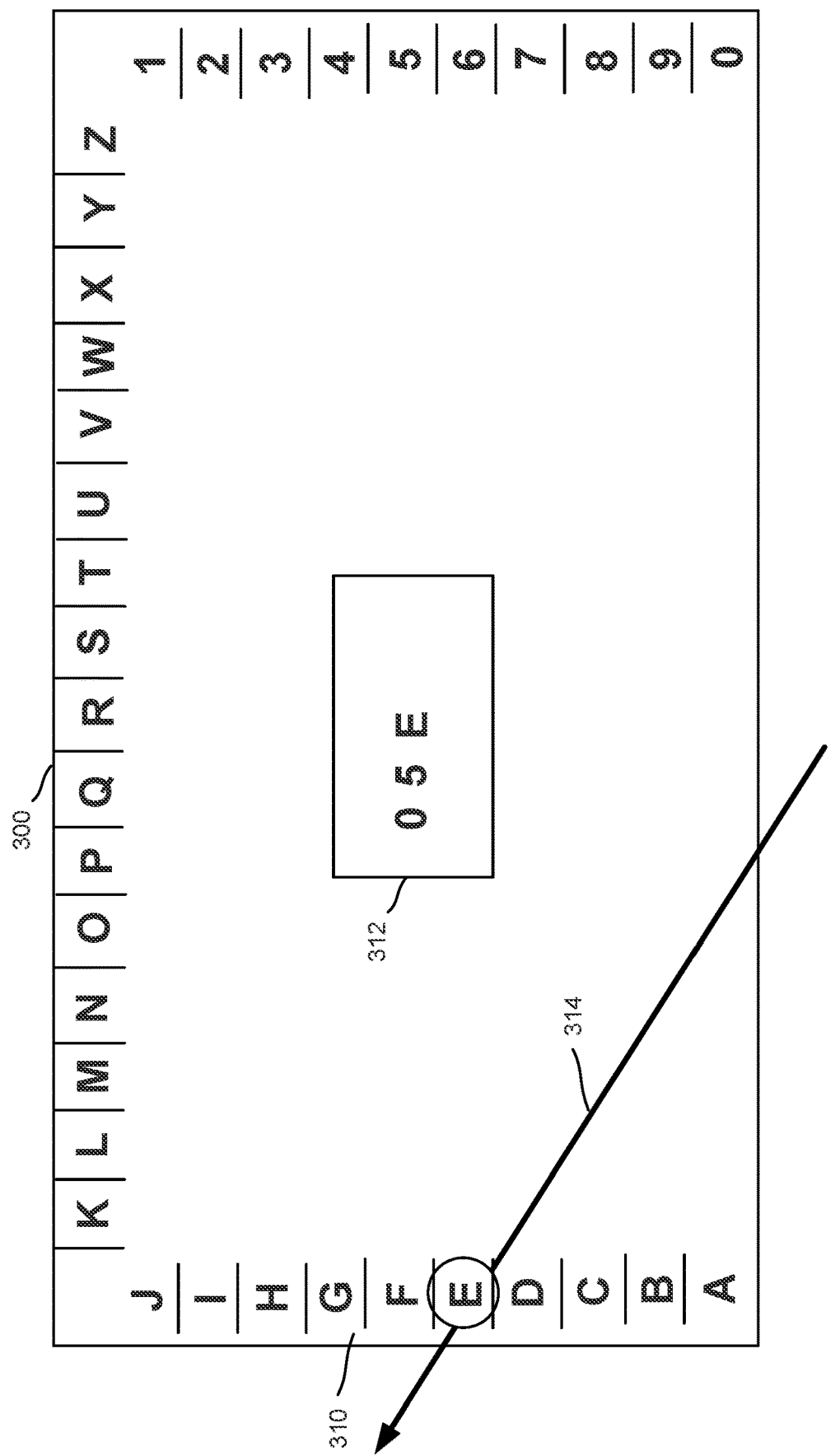
FIG. 3 illustrates a screenshot of displayed keys on an XR keyboard, according to an example.

FIG. 3 illustrates a screenshot of displayed keys on an XR keyboard. according to an example. That is, FIG. 3 depicts operation of XR keyboard system 100 in an authentication mode. As seen in screenshot 300, a user is prompted to view a visual perimeter of keys 310. Visual perimeter of keys 310 includes a variety of numbers and letters for the user to select for authentication. In response to being shown visual perimeter of keys 310, the user makes hand gestures indicated by projection line 314 to select numbers and/or letters indicating password 312.

Figure 4:
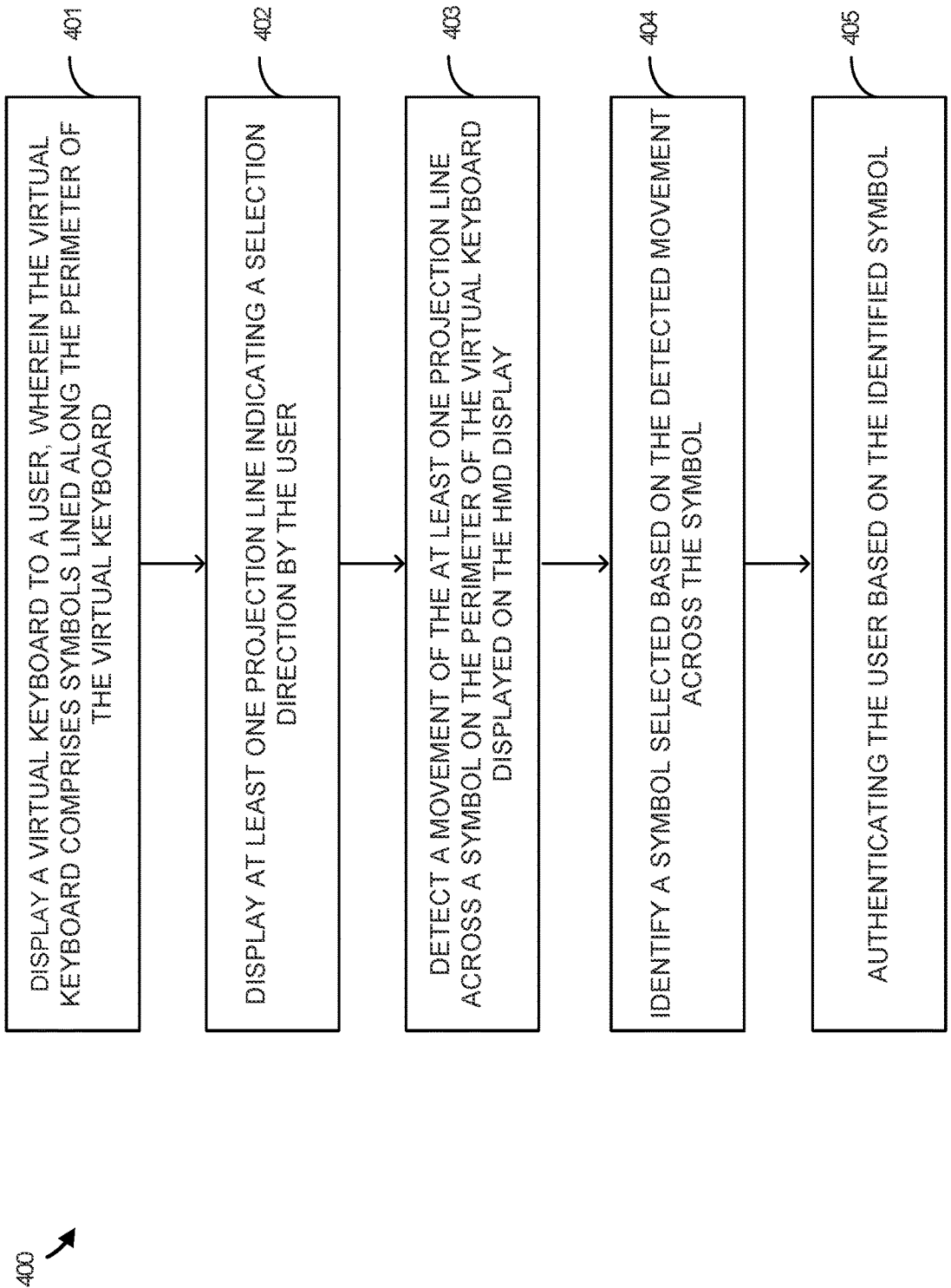
FIG. 4 illustrates a flow diagram of a process to authenticate a user of an HMD using symbol selection on a virtual keyboard, according to an example.

FIG. 4 illustrates a flow diagram of a process to authenticate a user of an HMD using symbol selection on a virtual keyboard, according to an example. Some or all of the steps of method 400 may be implemented in program instructions in the context of a component or components of an application used to carry out the user authentication. Although the flow diagram of FIG. 4 shows a specific order of execution, the order of execution may differ from that which is depicted. For example, the order of execution of two of more blocks shown in succession by be executed concurrently or with partial concurrence. All such variations are within the scope of the present disclosure.

Referring parenthetically to the steps in FIG. 4, method 400 displays, by an HMD display, a virtual keyboard to a user, wherein the virtual keyboard comprises symbols lined along the perimeter of the virtual keyboard, at 401. Method 400 displays, by the HMD display, at least one projection line indicating a selection direction by the user, at 402. The projection lines may indicate a virtual extension from the end of one or more hand controllers or from the tips of a user's hands.

In response, method 400 detects, by a user input device, a movement of the at least one projection line across a symbol on the perimeter of the virtual keyboard displayed on the HMD display, at 403. In some examples, the user input device may comprise a hand controller which includes an IMU, accelerator, gyroscope, or some other motion detection mechanism to determine a user slicing movement selecting a symbol on the HMD display. In other examples, the user input device may comprise a camera attached to the HMD or a host computing device which detects a user's hand movements.

Method 400 identifies a symbol selected based on the captured movement across the symbol, at 404. In some examples, symbol selected based on the captured movement across the symbol are identified by a slicing movement from inside the perimeter to outside the perimeter across the symbol. Further in this example, another slicing movement may be identified from the outside of the perimeter to the inside of the perimeter of the virtual keyboard before another symbol is selected. In other examples, a circular movement into the perimeter of the virtual keyboard may be identified before another symbol is selected. Method 400 then authenticates the user based on the identified symbol, at 405.

FIG. 5 illustrates a block diagram of a non-transitory storage medium storing machine-readable instructions to enable a user to select a symbol using an XR keyboard, according to an example. Storage medium is non-transitory in the sense that is does not encompass a transitory signal but instead is made up of a memory component configured to store the relevant instructions.

The machine-readable instructions include instructions 502 to display, by an XR display, an XR keyboard to a user and at least one projection line indicating a selection direction by the user, wherein the XR keyboard comprises symbols lined along the perimeter of the XR keyboard. The machine-readable instructions also include instructions 504 to detect, by a user input device, a slicing movement of the at least one projection line across a symbol on the perimeter of the XR keyboard displayed on the XR display. The machine-readable instructions also include instructions 506 to identify a symbol selected based on the captured slicing movement across the symbol.

In one example, program instructions 502-506 can be part of an installation package that when installed can be executed by a processor to implement the components of a computing device. In this case, non-transitory storage medium 500 may be a portable medium such as a CD, DVD, or a flash drive. Non-transitory storage medium 500 may also be maintained by a server from which the installation package can be downloaded and installed. In another example, the program instructions may be part of an application or applications already installed. Here, non-transitory storage medium 500 can include integrated memory, such as a hard drive, solid state drive, and the like.

Figure 6:
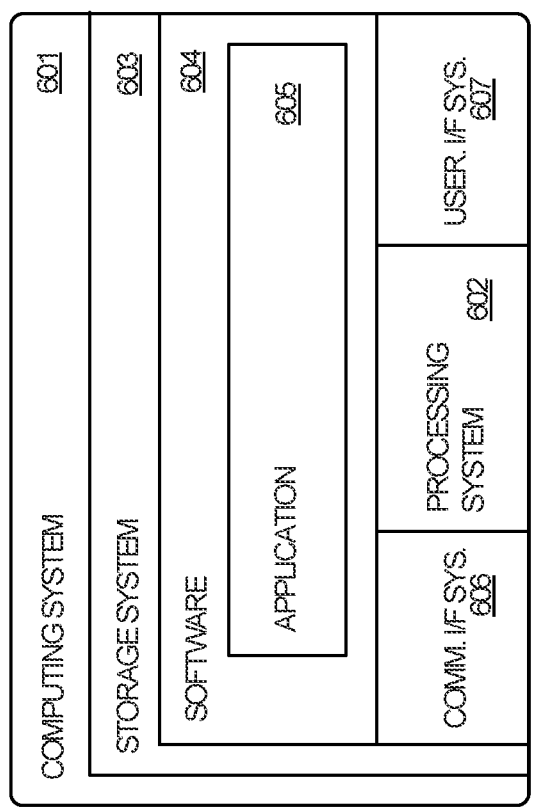
FIG. 6 illustrates a block diagram of a computing system, which is representative of any system or visual representation of systems in which the various applications, services, scenarios, and processes disclosed herein may be implemented.

FIG. 6 illustrates a block diagram of computing system 601, which is representative of any system or visual representation of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 604, communication interface system 606, and user interface system 607. Processing system 602 is operatively coupled with storage system 603, communication interface system 606, and user interface system 607.

Processing system 602 loads and executes software 604 from storage system 603. Software 604 includes application 605, which is representative of the processes discussed with respect to the preceding FIGS. 1-5, including method 200. When executed by processing system 602 to enhance an application, software 604 directs processing system 602 to operate as described herein for at least the various processes, operational scenarios, and sequences discussed in the foregoing examples. Computing system 601 may optionally include additional devices, features, or functionality not discussed for purposes of brevity.

Referring still to FIG. 6, processing system 602 may comprise a micro-processor and other circuitry that retrieves and executes software 604 from storage system 603. Processing system 602 may be implemented within a single processing device but may also be distributed across multiple processing devices or sub-systems that cooperate in executing program instructions. Examples of processing system 602 include general purpose central processing units, graphical processing unites, application specific processors, and logic devices, as well as any other type of processing device, combination, or variation.

Storage system 603 may comprise any computer readable storage media readable by processing system 602 and capable of storing software 604. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 603 may be implemented as a single storage device but may also be implemented across multiple storage devices or sub-systems co-located or distributed relative to each other. Storage system 603 may comprise additional elements, such as a controller, capable of communicating with processing system 602 or possibly other systems.

Software 604 may be implemented in program instructions and among other functions may, when executed by processing system 602, direct processing system 602 to operate as described with respect to the various operational scenarios, sequences, and processes illustrated herein. Software 604 may include program instructions for implementing method 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 604 may include additional processes, programs, or components, such as operating system software, virtual machine software, or other application software, in addition to or that include application 605. Software 604 may also comprise firmware or some other form of machine-readable processing instructions executable by processing system 602.

In general, software 604 may, when loaded into processing system 602 and executed, transform a suitable apparatus, system, or device (of which computing system 601 is representative) overall from a general-purpose computing system into a special-purpose computing system. Indeed, encoding software 604 on storage system 603 may transform the physical structure of storage system 603. The specific transformation of the physical structure may depend on various factors in different examples of this description. Such factors may include, but are not limited to, the technology used to implement the storage media of storage system 603 and whether the computer-storage media are characterized as primary or secondary storage, as well as other factors.

If the computer readable storage media are implemented as semiconductor-based memory, software 604 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 606 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 607 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 607. In some cases, the input and output devices may be combined in a single device, such as a display capable of displaying images and receiving touch gestures. The aforementioned user input and output devices are well known in the art and need not be discussed at length here. User interface system 607 may also include associated user interface software executable by processing system 602 in support of the various user input and output devices discussed above.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. Certain inventive aspects may be appreciated from the foregoing disclosure, of which the following are various examples.

The functional block diagrams, operational scenarios and sequences, and flow diagrams provided in the FIG.s are representative of example systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. It should be noted that a method could alternatively be represented as a series of interrelated states or events, such as in a state diagram. Moreover, not all acts illustrated in a methodology may be required for a novel example.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

The invention claimed is:

1. An extended reality (XR) keyboard system, comprising:
   a head mountable device (HMD) comprising an HMD display;
   a user input device communicatively coupled to the HMD, the user input device comprising a camera to capture movement of at least one projection line across a key; and
   a processor operatively coupled with a computer readable storage medium and instructions stored on the computer readable storage medium that, when read and executed by the processor, direct the processor to:
      display, by the HMD display, an XR keyboard to a user of the HMD, wherein the XR keyboard comprises keys lined along a perimeter of the XR keyboard;
      display, by the HMD display, the at least one projection line indicating a selection direction by the user;
      capture, by the user input device, a movement of the at least one projection line across a key on the perimeter of the XR keyboard displayed on the HMD display;
      identify, based on the captured movement across the key, a selected key; and
      detect, by a user hand gesture, an indication to change modality from a first set of keys to a second set of keys lined along the perimeter of the XR keyboard, wherein the at least one projection line follows the user hand gesture.

2. The XR keyboard system of claim 1, wherein to identify the key selected based on the captured movement across the key comprises identifying a slicing movement from inside the perimeter to outside the perimeter across the key.

3. The XR keyboard system of claim 2, wherein the instructions further direct the processor to identify another slicing movement from outside of the perimeter to inside of the perimeter of the XR keyboard before another key is selected.

4. The XR keyboard system of claim 2, wherein the instructions further direct the processor to identify a circular movement into the perimeter of the XR keyboard before another key is selected.

5. The XR keyboard system of claim 1, wherein the user input device comprises at least one hand controller to capture the movement of the at least one projection line across the key, wherein the at least one projection line follows a movement made by the at least one hand controller.

6. The XR keyboard system of claim 5, wherein the instructions further direct the processor to detect, by a user push of a button on the at least one hand controller, an indication to change modality from a first set of keys to a second set of keys lined along the perimeter of the XR keyboard.

7. The XR keyboard system of claim 1, wherein the instructions further direct the processor to detect, by the at least one projection line across a virtual key selection, an indication to select a different modality from a first set of keys to a second set keys lined along the perimeter of the XR keyboard.

8. The XR keyboard system of claim 1, wherein the selected key comprises a key in a password entered to authorize a user.

9. A method of authenticating a user of a head mountable device (HMD) using a virtual keyboard, comprising:
displaying, by an HMD display, a virtual keyboard to a user, wherein the virtual keyboard comprises symbols lined along a perimeter of the virtual keyboard;
displaying, by the HMD display, at least one projection line indicating a selection direction by the user;
detecting, by a user input device, a movement of the at least one projection line across a symbol on the perimeter of the virtual keyboard displayed on the HMD display;
identifying a symbol selected based on the detected movement across the symbol; and
authenticating the user based on the identified symbol,
wherein identifying the symbol selected based on the detected movement across the symbol comprises identifying a slicing movement from inside the perimeter to outside the perimeter across the symbol.

10. The method of claim 9, further comprising identifying another slicing movement from outside of the perimeter to inside of the perimeter of the virtual keyboard before another symbol is selected.

11. The method of claim 9, further comprising identifying a circular movement into the perimeter of the virtual keyboard before another symbol is selected.

12. A non-transitory computer-readable storage medium storing instructions that, when executed by a processor, cause the processor to:
display, by an extended reality (XR) display, an XR keyboard to a user and at least one projection line indicating a selection direction by the user, wherein the XR keyboard comprises symbols lined along a perimeter of the XR keyboard;
detect, by a user input device, a slicing movement of the at least one projection line across a symbol on the perimeter of the XR keyboard displayed on the XR display; and
identify, to identify a symbol selected based on the detected slicing movement across the symbol, a slicing movement from inside the perimeter to outside the perimeter across the symbol.

* * * * *